United States Patent [19]

Gulistan

[11] Patent Number: 4,655,658

[45] Date of Patent: Apr. 7, 1987

[54] CAPTIVE PANEL FASTENER

[76] Inventor: Bulent Gulistan, 20568 Pinnacle La., Malibu, Calif. 90265

[21] Appl. No.: 815,712

[22] Filed: Jan. 2, 1986

[51] Int. Cl.⁴ .................................. F16B 43/00
[52] U.S. Cl. ............................ 411/353; 10/155 R; 29/437; 29/512; 411/337; 411/999
[58] Field of Search ............. 411/353, 352, 337, 371, 411/333, 334, 999, 360; 10/155 R; 29/512, 437

[56] References Cited

U.S. PATENT DOCUMENTS

| | | | |
|---|---|---|---|
| 1,788,750 | 1/1931 | Snyder | 411/337 |
| 2,368,843 | 2/1945 | Kees | 29/437 X |
| 2,577,654 | 12/1951 | Gates | 29/512 X |
| 2,949,143 | 8/1960 | Shur | 411/353 |
| 3,062,253 | 11/1962 | Millheiser | 411/999 X |
| 3,346,032 | 10/1967 | Gulistan | 411/999 X |
| 3,561,093 | 2/1971 | Gulistan | 29/512 X |
| 3,571,904 | 3/1971 | Gulistan | 29/512 X |
| 3,995,675 | 12/1976 | Cosenza | 411/353 |

Primary Examiner—Alfred C. Perham
Attorney, Agent, or Firm—Poms, Smith, Lande & Rose

[57] ABSTRACT

A captive panel fastener includes a head, a shank and a threaded outer end, with slots extending longitudinally down through the threads towad the outer end of the fastener. A relatively rigid and inflexible retention washer is provided and this washer has inwardly extending prongs which fit into the longitudinally extending slots on the fastener. The outer end of the fastener has a hole in it, and, after the washer is in place, a forming tool is employed to deform the outer end wall of the opening, so that the wall is pushed outwardly to block the outer ends of the longitudinally extending slots, thereby holding the washer onto the fastener, and retaining it extending through a hole in a panel or the like through which it may have been inserted. A small washer may be employed at the end of the fastener between the ends of the slots and the deformed extreme outer end of the fastener.

17 Claims, 5 Drawing Figures

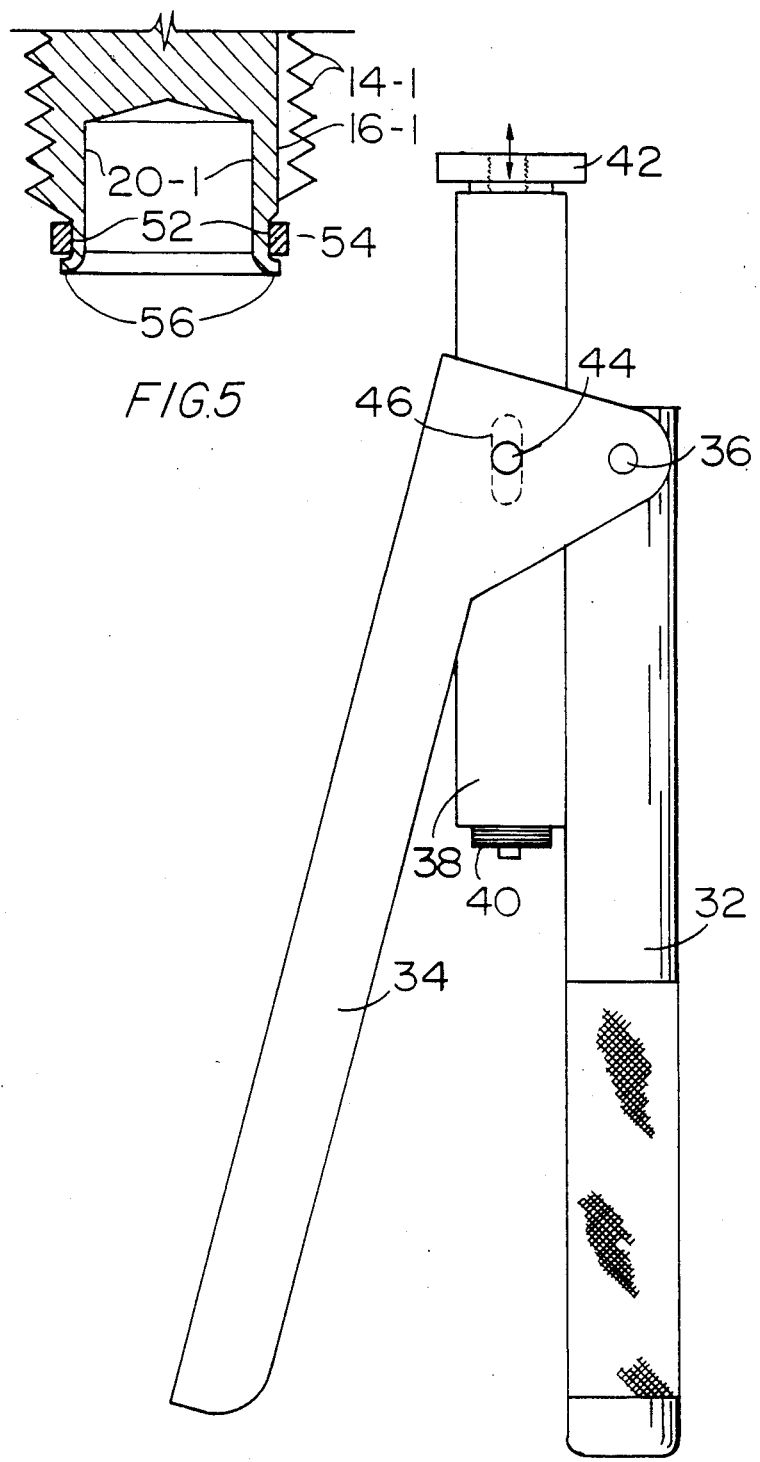

4,655,658

CAPTIVE PANEL FASTENER

FIELD OF THE INVENTION

The present invention relates to captive panel fasteners, wherein the fastener is held in position extending through a hole in a panel, and secured to the panel ready for the threaded end of the fastener to be secured to a nut, or into a tapped hole, for example.

BACKGROUND OF THE INVENTION

Captive screws, or captive panel fasteners are well known in the industry. This type of fastener is arranged so that a screw or a bolt is held in position extending through an opening in a panel, with the threaded end of the screw extending out on the other side of the panel. When large panels with many fasteners are used, for example, in aircraft or similar assemblies, it is important that these fasteners be properly held in position, with the fastener held captive on the panel ready for the securing of the threaded end of the fastener to a nut or into a tapped hole.

One type of captive panel fastener which has been widely used, includes three slots which extend longitudinally from the head through the threaded area of the screw or bolt, adjacent the end of the fastener and which stop short of the end of the fastener. A resilient washer is used with this type of fastener, and after the screw or bolt is extended through a hole in the panel, a flexible washer having three inwardly extending prongs is snapped over the end of the fastener, with a special tool so that the three prongs extend into the three longitudinal slots extending through the threads and the shank of the fastener. The slots must be carefully formed and the outer ends of the slots must be sharply formed, so there is no ramp, which might assist in the flexible washer prongs sliding off the outer end of the fastener. Because the slots must be very accurately formed, they are normally formed by an EDM process in which material is removed by an electrode in a bath. This is a relatively expensive process, and results in a relatively high cost fastener. Even a relatively small fasteners of this type may cost as much as $30.00 apiece for aircraft or missile-type fastener applications.

Incidentally, it may be noted that captive panel fasteners of the type mentioned above in which the retaining washers are secured in slots at the threaded end of the fastener, are advantageous in that the shanks of the screws or bolts between the head and the threads may be of larger outer diameter (OD) and greater strength than many other types of captive panel fasteners, and accordingly carry a full shear load.

An important object of the present invention is to provide a captive panel fastener of the type described hereinabove which is much less costly to produce.

SUMMARY OF THE INVENTION

In accordance with the present invention, instead of using a very flexible retaining washer with three inwardly directed prongs, and longitudinally extending slots terminating short of the end of the screw made by an EDM process, a different, simpler mechanical process is employed.

More specifically, the longitudinal slots may be formed by a simpler machining process such as grinding or milling, with the slots extending through the threads to the outer end of the fastener, and the threaded end of the fastener has a hole in it so that after the washer is applied to the fastener, the outer end of the screw may be formed and bent outwardly to a slight extent to close the ends of the slots. In addition, the washer may be formed of relatively thicker and less flexible stock material than was possible using the prior art arrangements in which the outer ends of the slots were already closed.

Concerning another aspect of the invention, in view of the application of the retaining washer while the slots are still open, it has been determined that only two slots are necessary instead of the three which has generally been used heretofore with this type of captive panel fastener. However, of course, three slots may be employed if desired.

With regard to another aspect of the invention, a hand tool may be provided for forming the outer end of the new captive panel fastener. This tool includes a threaded portion having female threads, into which the fastener is threaded, with the retaining washer in place, and a plunger which is advanced into the hole at the end of the fastener to form the outer end of the fastener and close-off the ends of the slots.

In accordance with an additional feature of the invention, the outer end of the fastener may have a cylindrical configuration with an outer diameter somewhat less than the root diameter of the threads; and a small washer having an inner diameter closely fitting the cylindrical outer end of the fastener, is slid over it, after assembly of the pronged retention washer and prior to the deformation step. The small washer provides a continuous peripheral surface blocking the ends of the slots to positively hold the prongs of the retention washer in place, after the small washer is secured in place by the outward formation of the extreme outer end of the fastener. Incidentally the outer diameter of the small additional washer (or the formed end of the fastener where no small washer is used) should be such as to extend outward well beyond the bottom surface of the slots, but only to the root diameter of the threads, so there is no interference when the fasteners are threaded into a tapped hole or the like.

It is expected that, through the use of the simpler machining process, and avoiding the EDM method steps, that the price of the fasteners may be drastically reduced, probably approximately cut in half.

Other objects, features and advantages will become apparent from a consideration of the following detailed description, and from the accompanying drawings.

BRIEF DESCRIPTION OF THE DRAWINGS

FIG. 4 shows a hand tool which may be employed to accomplish the forming step indicated schematically in FIG. 1; and FIG. 5 is a partial cross-sectional view showing an alternative embodiment of the invention using a small supplemental washer.

DETAILED DESCRIPTION

Figure 1:
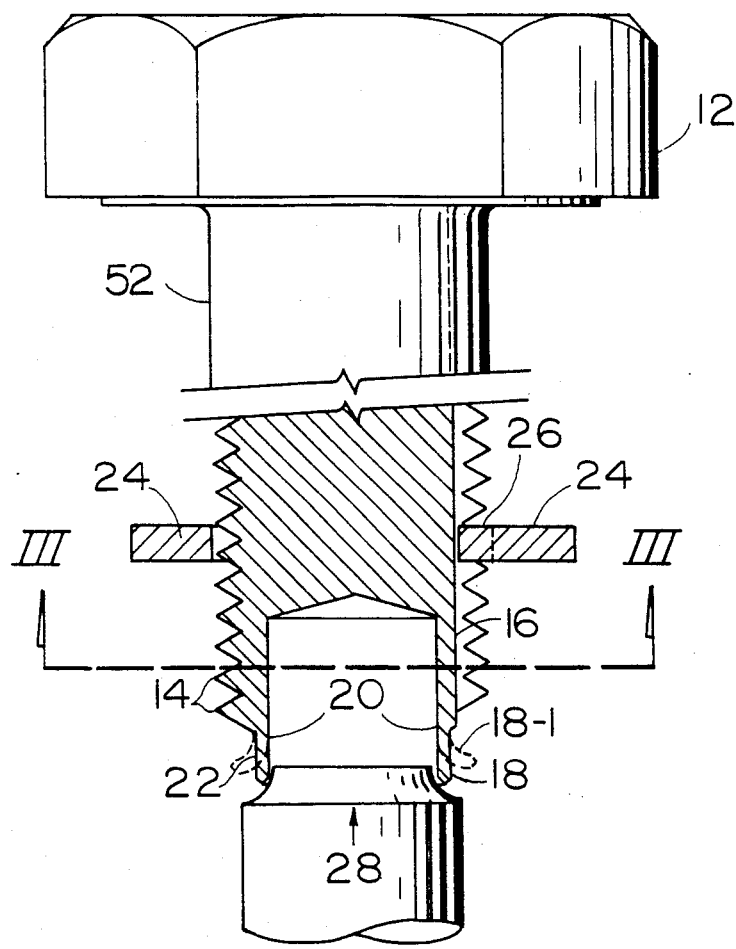
FIG. 1 is a cross-sectional view through a threaded fastener and retaining washer, taken along lines I—I of FIG. 3, and illustrating the principles of the present invention.

Referring more particularly to the drawings, FIG. 1 shows a captive panel fastener illustrating the principles of the present invention. The fastener of FIG. 1 has a head 12 and an outer threaded end 14. The fastener is also provided with a plurality of slots 16 which extend from very close to the head of the fastener to the outer end of the threads 14.

At the lower end of the fastener of FIG. 1, beyond the end of the threads 14, is a thin walled portion 18 of the fastener, between the central hole 20 in the end of the fastener and the outer surface 22 of the end of the fastener which initially has a diameter which is slightly less than twice the distance from the center of the fastener to the bottom of the slots 16. After the fastener is mounted through a panel (not shown) and the retaining washer 24 is mounted with its inwardly extending prongs 26 extending into the slots 16, the outer end of the fastener is deformed by the plunger tool 28. The action of the plunger tool 28 is to bend the end 18 of the fastener outwardly to the position shown at 18-1 where it will block the outer ends of the slots 16, either directly or indirectly, and therefore prevent the retaining washer 24 from sliding off the outer end of the fastener.

Figures 2, 3:
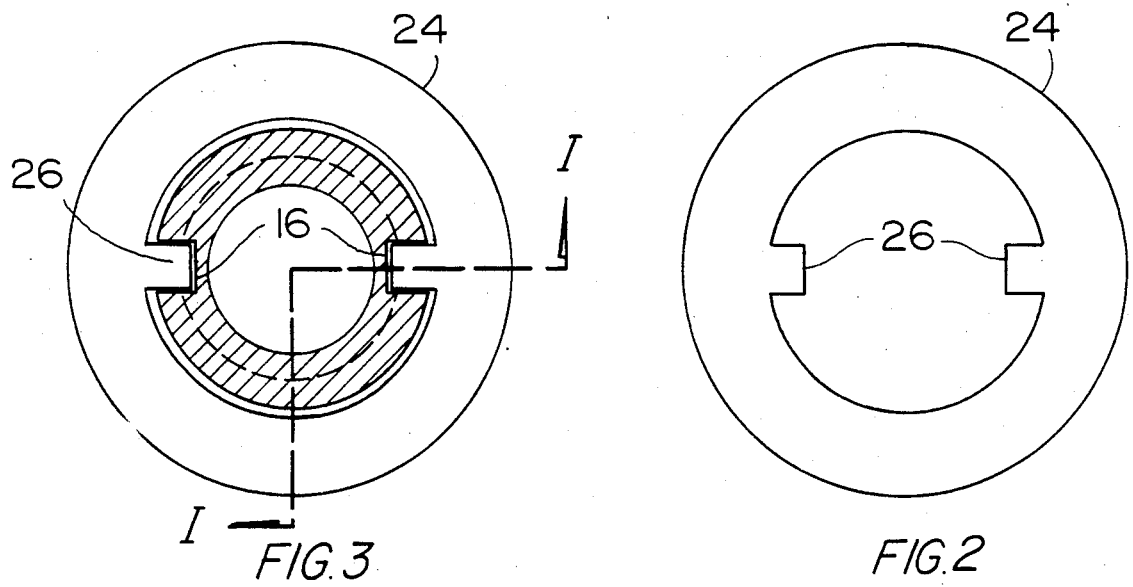
FIG. 2 is a plan view of a washer which may be employed in the implementation of the present invention.
FIG. 3 is a cross-sectional view taken along lines III—III of FIG. 1.

FIG. 3 is a cross-sectional view taken along lines III—III of FIG. 1. It may also be noted that the cross-sectional view of FIG. 1 is taken along lines I—I of FIG. 3. For this reason, the slot 16 is visible toward the right-hand side of FIG. 1, but does not appear in the showing at the left-hand side of FIG. 1.

FIG. 4 shows a hand tool which is employed to accomplish the forming step indicated at FIG. 1 employing plunger 28, acting on the end portion 18 of the fastener, deflecting it to the position designated 18-1 in FIG. 1. The hand tool of FIG. 4 is a commercially available hand tool with the exception of the specific tool operating parts, which are of course, special. More specifically, the hand tool of FIG. 4 includes the two movable handle members 32 and 34, with these two members being pivotally secured together at pivot point 36. Secured to the handle member 32, is a cylindrical cartridge 38 within which the forming step takes place. The forming tool 28 is secured in a fixed position from the bottom of the cartridge 38, and may be assembled and removed by the threaded member 40, which may be threaded into the lower end of the cartridge 38. A movable member 42 is mounted within the cartridge 38 for axial movement relative to it, under the control of the handle 34. More specifically, the member 42 is directly coupled to the handle 34 by the outwardly extending members or pins 44 which extend through closely fitting holes in handle member 34 on both sides of cartridge 38, for axial movement of part 42 by the handle 34. The pins 44 are firmly secured to the member 42, and part 42 is actuated up and down as the handle 34 is moved. The enlarged vertically extending opening 46 shown in dashed lines in FIG. 4, is in both of the outer surfaces of the cartridge 38, permitting the pins 44 to move up and down and to carry the member 42 with them. In operation, the fastener is threaded into the threaded opening at the top of member 42, and the handle 34 is then actuated to close against the handle 32, thereby forcing the lower end of the fastener including its end 18 into engagement with the forming mandrel 28, which deforms the lower end of the screw or bolt, as indicated at 18 and 18-1 in FIG. 1.

It is noted in passing that the shank 52 of the screw or bolt 12 may be of relatively large diameter, comparable to the outer diameter of the threaded portion of the screw, or even somewhat greater, up to the washer O.D. This is in contrast to certain other types of captive panel fastener assemblies wherein the shank is reduced and is therefore somewhat weakened to receive a certain retaining arrangements.

FIG. 5 shows an alternative end configuration for the fastener of FIG. 1, wherein the fastener including the threads 14-1 and the opening 20-1; and other features of the fastener away from the end are substantially as shown in FIGS. 1, 2 and 3. However, in the embodiment of FIG. 5, the outer end of the fastener is initially reduced down to a diameter 52 slightly less than twice the radial distance to the bottom of the slots 16-1. After the pronged retention washer 24 (see FIGS. 1-3) is applied over the end of the fastener and up into the slots 16-1, the small washer 54 is slid onto the end of the fastener, to block the lower ends of the slots 16-1 and the extreme lower end 56 of the fastener is deformed outwardly to hold the small washer 54 in place. Thus, the formed out-turned end of the fastener may either directly block the lower ends of the slots 16-1, or may do so indirectly by holding the washer 54 in place. The outer diameter of washer 54 in FIG. 5, and the outwardly deformed metal 18-1 in FIG. 1 and 56 in FIG. 5 are preferably about equal to the root diameter of the threads, so that there is no interference as the fastener is threaded into a tapped hole (including that in the forming tool member 42 of FIG. 4).

In conclusion, it is to be understood that the foregoing detailed description and the accompanying drawings relate to one preferred embodiment of the invention. Other alternative arrangements may be employed without departing from the spirit and scope of the invention. Thus, the number of slots may be varied from one to four, for example, although two is preferred. It is also noted that the extent of the threads and the nature of the head of the fastener will depend on the particular application. Further, the depth of the hole need not be as great as indicated in FIG. 1 of the drawings, but only adequate to permit entry of the forming plunger 28, and deformation of the outer end 18 of the fastener. Any suitable type of deforming tool and applicator may be employed, and a simple impact-type deformation tool could be used, with the head of the screw or bolt being backed up by a substantial weight such as a large hammer, while the deformation step is being accomplished at the other side of the panel. Accordingly, it is to be understood that the detailed description and the drawings as set forth hereinabove are for illustrative purposes only, and do not constitute a limitation on the scope of the invention.

What is claimed is:

1. An inexpensive high strength captive panel fastener assembly comprising:
    a fastener having a head, shank and a threaded outer end;
    said shank having an outer diameter comparable to the outer diameter of the threaded portion of said fastener;
    the outer end of said fastener having a central opening;
    the shank of said fastener including said threaded outer end having a plurality of longitudinally extending slots;

a washer having inwardly extending prong means for fitting into said longitudinally extending slots, said washer being relatively inflexible; and formable end wall means at the outer end of said fastener bolt for blocking the outer ends of said slots and retaining said washer onto said fastener by preventing said washer prongs from sliding off the end of the fastener, and thereby holding the fastener captive in the desired location said formable end wall means being formed of the same material as, and being integral with the remainder of said fastener, and said formable end wall means being wholly within the profile of the extended pattern of threads of said fastener.

2. An inexpensive high strength captive panel fastener assembly as defined in claim 1 wherein said shank has a diameter comparable to or greater than the outer diameter of the threads of said fastener but less than the outer diameter of said washer.

3. An inexpensive high strength captive panel fastener assembly as defined in claim 1 wherein said fastener has only two slots and wherein said washer has two corresponding inwardly directed prongs.

4. An inexpensive high strength captive panel fastener assembly as defined in claim 1 wherein said end wall means has an initial outer diameter which is slightly less than the distance between the bottom of two opposed slots, whereby said washer may readily slide over the end of the fastener into said slots, prior to deformation of said end wall means.

5. An inexpensive high strength captive panel fastener assembly as defined in claim 1 wherein the outer diameter of said formable end wall means after deformation is equal to or slightly less than the root diameter of the threads on said fastener.

6. An inexpensive high strength captive panel fastener assembly as defined in claim 1 wherein said end wall means has an outer diameter which has a radial extent slightly less than the bottom of said slots.

7. An inexpensive high strength captive panel fastener assembly as defined in claim 1 further comprising a small washer means having an outer diameter extending beyond the bottom of said slots, said small washer being mounted on the outer end of said fastener between the ends of said slots and said formable end wall means, whereby said formable end wall means blocks the ends of said slots indirectly by holding said small washer in place.

8. An inexpensive high strength captive panel fastener assembly conprising:
a fastener having a head, and a shank including a threaded portion, and an unthreaded outer end portion having a reduced diameter slightly less than the root diameter of said threads;
said fastener shank having a plurality of longitudinally extending slots extending through the threads on said threaded portion of said fastener;
a retention washer having inwardly extending prong means for fitting into said longitudinally extending slots;
deformable means at the outer end of said fastener for blocking the outer ends of said slots and retaining said washer onto said fastener by preventing said washer prongs from sliding off the end of the fastener, and thereby holding the fastener captive in the desired location said formable end wall means being formed of the same material as, and being integral with the remainder of said fastener, and said formable end wall means being wholly within the profile of the extended pattern of threads of said fastener.

9. An inexpensive high strength captive panel fastener assembly as defined in claim 8 further comprising small washer means having an outer diameter extending outwardly beyond the bottoms of said slots, said small washer being mounted on said unthreaded reduced diameter portion of said fastener between the ends of said slots and said deformable means, whereby said deformable means blocks the ends of said slots indirectly by holding said small washer in place.

10. An inexpensive high strength captive panel fastener assembly as defined in claim 8 wherein said fastener has a shank having a diameter comparable to the outer diameter of the threads of said fastener.

11. An inexpensive high strength captive panel fastener assembly as defined in claim 8 wherein said fastener has only two slots and wherein said washer has two corresponding inwardly directed prongs.

12. An inexpensive high strength captive panel fastener assembly as defined in claim 8 wherein said unthreaded end portion has an initial outer diameter which is slightly less than the distance between the bottom of two opposed slots, whereby said washer may readily slide over the end of the fastener into said slots, prior to deformation of said deformable means.

13. An inexpensive high strength captive panel fastener assembly as defined in claim 8 wherein the outer diameter of said deformable means after deformation is substantially equal to or slightly less than the root diameter of the threads on said fastener.

14. A method for providing captive panel fasteners in place comprising the steps of:
fabricating a fastener having a head and a threaded outer end, said threaded outer end having a plurality of longitudinally extending slots, the outer end of said fastener having a central opening and a short unthreaded portion constituting a formable wall at the end of the fastener;
mounting said fastener in the desired captive location;
sliding a retention washer having inwardly extending prongs to fit closely into said slots with said washer extending around said fastener; and
deforming the formable end wall outwardly to block the outer ends of said slots to hold said retention washer onto said fastener by preventing said washer prongs from sliding off the end of the fastener and thereby holding the fastener in the desired location, with the outer extent of said end wall being limited to the thread profile, to avoid interference with mating threads.

15. A method as defined in claim 14 wherein the deforming step includes deforming said formable end wall from an initial outer diameter having a radial extent less than the bottom of said slots to a diameter substantially greater than the bottom of said slots.

16. A method as defined in claim 14 wherein said sliding step includes the use of a washer having only two inwardly directed prongs.

17. A method as defined in claim 14 including the additional step of assembling a small washer over said formable end wall to block the ends of said slots prior to said deformation step, whereby said deforming step blocks the ends of said slots indirectly by holding the small washer in place.

* * * * *